United States Patent
Jin et al.

(10) Patent No.: US 11,982,904 B2
(45) Date of Patent: May 14, 2024

(54) LIGHT CONVERSION STRUCTURE, BACKLIGHT DEVICE AND VIRTUAL REALITY DISPLAY DEVICE

(71) Applicant: BOE TECHNOLOGY GROUP CO., LTD., Beijing (CN)

(72) Inventors: Liangliang Jin, Beijing (CN); Ruoyu Ma, Beijing (CN); Zezhou Yang, Beijing (CN); Haiwei Sun, Beijing (CN); Zhongbao Wu, Beijing (CN); Chuandong Liao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 755 days.

(21) Appl. No.: 17/254,829

(22) PCT Filed: Jun. 17, 2020

(86) PCT No.: PCT/CN2020/096661
§ 371 (c)(1),
(2) Date: Dec. 21, 2020

(87) PCT Pub. No.: WO2020/259374
PCT Pub. Date: Dec. 30, 2020

(65) Prior Publication Data
US 2021/0278724 A1    Sep. 9, 2021

(30) Foreign Application Priority Data

Jun. 24, 2019   (CN) .......................... 201910548784.4

(51) Int. Cl.
*G02F 1/1335*   (2006.01)
*G02B 5/04*     (2006.01)
*G02F 1/13363*  (2006.01)

(52) U.S. Cl.
CPC ....... *G02F 1/133607* (2021.01); *G02B 5/045* (2013.01); *G02F 1/133634* (2013.01)

(58) Field of Classification Search
CPC ......... G02F 1/133607; G02F 1/133634; G02B 5/045

(Continued)

(56) References Cited

U.S. PATENT DOCUMENTS

| | | |
|---|---|---|
| 5,396,350 A | 3/1995 | Beeson et al. |
| 5,661,603 A | 8/1997 | Hanano et al. |

(Continued)

FOREIGN PATENT DOCUMENTS

| | | |
|---|---|---|
| CN | 1136349 A   | 11/1996 |
| CN | 101324726 A | 12/2008 |

(Continued)

OTHER PUBLICATIONS

ISA China National Intellectual Property Administration, International Search Report and Written Opinion Issued in Application No. PCT/CN2020/096661, dated Oct. 15, 2020, WIPO, 17 pages.

(Continued)

*Primary Examiner* — Laura K Tso
(74) *Attorney, Agent, or Firm* — McCoy Russell LLP (57) ABSTRACT

A light conversion structure, backlight device and virtual reality display device are provided. The light conversion structure includes: a transparent substrate including first and second surfaces arranged oppositely; multiple first prism structures arranged in an array on the first surface, each first prism structure includes first and second light-entering surfaces arranged adjacently or oppositely, the first and second light-entering surfaces are for receiving the first and second incident light respectively; multiple second prism structures arranged in an array on the second surface, each second prism structure includes the first and second light-exiting (Continued)

surfaces arranged adjacently or oppositely; the first and second incident light enter the first prism structure from the first and second light-entering surfaces respectively, and exit from the first and second light-exiting surfaces respectively at the first and second predetermined angles respectively; a difference between the first and second predetermined angles is less than a predetermined value.

17 Claims, 6 Drawing Sheets

(58) Field of Classification Search
USPC .......................................................... 362/339
See application file for complete search history.

(56) References Cited

U.S. PATENT DOCUMENTS

| | | | |
|---|---|---|---|
| 6,129,439 | A | 10/2000 | Hou et al. |
| 8,068,187 | B2 * | 11/2011 | Huizinga ............... G02B 30/27 |
| | | | 349/65 |
| 2008/0259634 | A1 | 10/2008 | Mi et al. |
| 2009/0154157 | A1 * | 6/2009 | Sah ....................... G02B 5/0278 |
| | | | 362/339 |
| 2017/0242183 | A1 | 8/2017 | Song et al. |
| 2017/0293055 | A1 | 10/2017 | Sun et al. |
| 2019/0302329 | A1 | 10/2019 | Jin et al. |

FOREIGN PATENT DOCUMENTS

| | | |
|---|---|---|
| CN | 101526691 A | 9/2009 |
| CN | 101684927 A | 3/2010 |
| CN | 105116477 A | 12/2015 |
| CN | 108469642 A | 8/2018 |
| CN | 110161758 A | 8/2019 |
| JP | H08129146 A | 5/1996 |
| TW | 278142 B | 6/1996 |
| WO | 2004036294 A2 | 4/2004 |

OTHER PUBLICATIONS

State Intellectual Property Office of the People's Republic of China, Office Action and Search Report Issued in Application No. 201910548784.4, dated Mar. 4, 2021, 11 pages. (Submitted with Partial Translation).

* cited by examiner

LIGHT CONVERSION STRUCTURE, BACKLIGHT DEVICE AND VIRTUAL REALITY DISPLAY DEVICE

CROSS REFERENCE TO RELATED APPLICATIONS

This application is a U.S. national phase application of a PCT Application No. PCT/CN2020/096661 filed on Jun. 17, 2020, which claims a priority to Chinese Patent Application No. 201910548784.4 filed on Jun. 24, 2019, the disclosures of which are incorporated in their entirety by reference herein.

TECHNICAL FIELD

The present disclosure relates to the field of display product manufacturing technology, in particular to a light conversion structure, a backlight device and a virtual reality display device.

BACKGROUND

Virtual Reality (VR) technology is a new practical technology developed in the 20th century. The virtual reality technology incorporates computer technology, electronic information technology and emulation technology. A basic means of implementing the virtual reality technology is to simulate a virtual environment by using a computer to give people a sense of environmental immersion.

SUMMARY

An embodiment of the present disclosure provides a light conversion structure. The light conversion structure includes:
a transparent substrate, where the transparent substrate includes a first surface and a second surface arranged oppositely;
a plurality of first prism structures, where the first prism structures are arranged in an array on the first surface, each of the first prism structures includes a first light-entering surface and a second light-entering surface that are arranged adjacent or opposite to each other, the first light-entering surface is used to receive a first incident light entering in a first direction, and the second light-entering surface is used to receive a second incident light entering in a second direction;
a plurality of second prism structures, where the second prism structures are arranged in an array on the second surface, the plurality of second prism structures are arranged in a one-to-one correspondence with the plurality of first prism structures, each of the second prism structures includes a first light-exiting surface and a second light-exiting surface that are arranged adjacent or opposite to each other;
the first incident light enters the first prism structure from the first light-entering surface, passes through the transparent substrate and the second prism structure corresponding to the first prism structure, and exits from the first light-exiting surface at a first predetermined angle;
the second incident light enters the first prism structure from the second light-entering surface, passes through the transparent substrate and the second prism structure corresponding to the first prism structure, and exits from the second light-exiting surface at a second predetermined angle;
a difference value between the first predetermined angle and the second predetermined angle is less than a predetermined value.

Optionally, the first predetermined angle is an angle between a light exiting from the first light-exiting surface and a direction perpendicular to the second surface, the second predetermined angle is an angle between a light exiting from the second light-exiting surface and the direction perpendicular to the second surface, the first predetermined angle is the same as the second predetermined angle.

Optionally, the first prism structures in each row or each column are symmetrically arranged with respect to a center of the row or a center of the column;
the second prism structures in each row or each column are symmetrically arranged with respect to a center of the row or a center of the column.

Optionally, the first prism structure includes the first light-entering surface and the second light-entering surface that are arranged adjacent to each other, and a first connection surface arranged on the transparent substrate, both the first light-entering surface and the second light-entering surface are connected to the first connection surface; the second prism structure includes the first light-exiting surface and the second light-exiting surface that are arranged adjacent to each other, and a second connection surface arranged on the transparent substrate, both the first light-exiting surface and the second light-exiting surface are connected to the second connection surface;
the first incident light enters the first prism structure from the first light-entering surface, is total-reflected at an inner side of the second light-entering surface, and then exits from the first light-exiting surface;
the second incident light enters the first prism structure from the second light-entering surface, is total-reflected at an inner side of the first light-entering surface, and then exits from the second light-exiting surface.

Optionally, a refractive index of the first prism structure and a refractive index of the second prism structure are the same.

Optionally, an exiting angle of a light exiting from the first light-exiting surface satisfies following formula:

$$\theta_{12} = \arcsin\left\{n_2 * \sin\left[\beta_2 + \alpha_2 - \alpha_3 + \arcsin\frac{\sin(\theta_4 - \alpha_1)}{n_1}\right]\right\} - \beta_2$$

$\theta_{12}$ is an angle between the light exiting from the first light-exiting surface and a direction perpendicular to the second surface, $\theta_4$ is an angle between the first incident light and a direction perpendicular to the first surface, $n_1$ is a refractive index of the first prism structure, $n_2$ is a refractive index of the second prism structure, $\alpha_1$ is an angle between the first light-entering surface and the first surface, and $\alpha_2$ is an angle between the second light-entering surface and the first surface, $\beta_2$ is an angle between the first light-exiting surface and the second surface, $\alpha_3$ is an angle between the first light-entering surface and the second light-entering surface.

Optionally, an exiting angle of a light exiting from the second light-exiting surface satisfies following formula:

$$\theta'_{12} = \beta_1 - \arcsin\left\{n_2 * \sin\left[\beta_2 + \alpha_1 - \alpha_3 + \arcsin\frac{\sin(\theta'_4 - \alpha_2)}{n_1}\right]\right\}$$

$\theta'_{12}$ is an angle between the light exiting from the second light-exiting surface and a direction perpendicular to the second surface, $\theta'_4$ is an angle between the second incident light and a direction perpendicular to the first surface, $n_1$ is a refractive index of the first prism structure, $n_2$ is a refractive index of the second prism structure, $\alpha_1$ is an angle between the first light-entering surface and the first surface, and $\alpha_2$ is an angle between the second light-entering surface and the first surface, $\alpha_3$ is an angle between the first light-entering surface and the second light-entering surface, $\beta_1$ is an angle between the second light-exiting surface and the second surface, $\beta_2$ is an angle between the first light-exiting surface and the second surface.

Optionally, an area of the first connection surface is the same as an area of the second connection surface, and an orthographic projection of the first connection surface of each first prism structure onto the transparent substrate completely overlaps an orthographic projection of the second connection surface of the corresponding second prism structure onto the transparent substrate.

Optionally, the first prism structures, the transparent substrate and the second prism structures are integrally formed.

The present disclosure further provides a backlight device. The backlight device includes a light guide plate and the foregoing light conversion structure, where the light guide plate includes a light-exiting surface, and the light conversion structure is located on a light-exiting side of the light guide plate, the light guide plate further includes a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

The present disclosure further provides a virtual reality display device, including the foregoing backlight device.

DETAILED DESCRIPTION

To describe the technical problem to be solved, the technical solutions and the advantages of the present disclosure more clearly, embodiments are described in detail hereinafter with reference to the accompanying drawings. Apparently, the described embodiments are merely a part of rather than all the embodiments of the present disclosure. All other embodiments obtained by a person of ordinary skill in the art based on the embodiments of the present disclosure without any creative efforts shall fall within the scope of the present disclosure.

At present, due to the optical path characteristics of a VR (virtual reality) system, it is necessary to develop a directing device suitable for VR display, to effectively improve the light efficiency. Moreover, a size of a display screen of the VR system is relatively small. With the continuous development of the VR system, the size of the display screen of the VR system continues to decrease, for example, some have been reduced to 2.48 inches. In addition, a side-lit backlight used in a LCD (Liquid Crystal Display) device will have more reflected light when the size is reduced, and the reflected light has a relatively long optical path length. In VR display, a failure in using the reflected light for light directing leads to a lower light energy utilization ratio. The light directing refers to adjusting the exiting direction of a light to an angle required for utilization, thereby improving the light energy utilization ratio.

In view of the above technical problems, a light conversion structure is provided by the embodiment of the present disclosure. The light conversion structure enables a first incident light in a first direction and a second incident light in a second direction to exit at a first predetermined angle and a second predetermined angle respectively, with a difference value between the first and second predetermined angles being less than a predetermined value. The light directing can be realized through the adjustment of exiting angles of the first incident light and the second incident light. When the light conversion structure is applied to a VR display backlight device with a relatively small screen size and having substantial reflected light, the light conversion structure can utilize the reflected light to achieve the light directing, so as to improve the light energy utilization ratio, and reduce the power consumption of a VR display device.

Specifically, as shown in FIG. 1 to FIG. 6, the light conversion structure 10 provided by the embodiment of the present disclosure includes:

a transparent substrate 101, where the transparent substrate 101 includes a first surface and a second surface arranged oppositely;

a plurality of first prism structures 102, where the first prism structures 102 are arranged in an array on the first surface, each of the first prism structures 102 includes a first light-entering surface and a second light-entering surface that are arranged adjacent or opposite to each other, the first light-entering surface is used to receive a first incident light 100 entering in a first direction, and the second light-entering surface is used to receive a second incident light 200 entering in a second direction;

a plurality of second prism structures 103, where the second prism structures 103 are arranged in an array on the second surface, the plurality of second prism structures 103 are arranged in one-to-one correspondence with the plurality of first prism structures 102, each of the second prism structures 103 includes a first light-exiting surface and a second light-exiting surface that are arranged adjacent or opposite to each other;

the first incident light 100 enters the first prism structure 102 from the first light-entering surface, passes through the transparent substrate 101 and the second prism structure 103, and can exit from the first light-exiting surface at a first predetermined angle;

the second incident light 200 enters the first prism structure 102 from the second light-entering surface, passes through the transparent substrate 101 and the second prism structure 103, and can exit from the second light-exiting surface at a second predetermined angle;

the difference value between the first predetermined angle and the second predetermined angle is less than the predetermined value.

According to the above technical solution, the first incident light 100 and the second incident light 200 entering the light conversion structure 10 in different directions can exit at the predetermined angles, so that with the adjustment of the exiting angles of the incident light, the exiting angles of the incident light can be matched with a VR optical path, and further the exiting angles of the first incident light 100 and the second incident light 200 entering the light conversion structure 10 in different directions can both be matched with the VR optical path, thereby improving the light energy utilization ratio. The VR optical path is a propagation path of a light in the VR display device when the light conversion structure 10 according to the present disclosure is applied to the VR display device.

The predetermined value can be set according to actual needs, as long as the light deflected by the light conversion structure 10 can be matched with the VR optical path. In a specific implementation of the embodiment, the first predetermined angle ($\theta_{12}$) is an angle between a light exiting from the first light-exiting surface and a direction perpendicular to the second surface, the second predetermined angle ($\theta'_{12}$) is an angle between the light exiting from the second light-exiting surface and the direction perpendicular to the second surface, and the first predetermined angle is the same as the second predetermined angle, that is, the predetermined value is zero. In other words, the difference value between the first predetermined angle and the second predetermined angle is zero.

In the embodiment, the first prism structures 102 in each row or each column are symmetrically arranged with respect to a center of the row or a center of the column respectively; the second prism structures 103 in each row or each column are symmetrically arranged with respect to a center of the row or a center of the column respectively.

The first prism structures 102 and the second prism structures 103 are all arranged on the transparent substrate 101 in a center-symmetric manner. After the incident light in different directions is deflected by the light conversion structure 10, the incident light all exits in directions converging toward the center of the transparent substrate 101, which effectively improves the light energy utilization ratio and ensures the light directionality.

Specific structure forms of the first prism structure 102 and the second prism structure 103 can be various. In the embodiment of the present disclosure, the first prism structure 102 includes the first light-entering surface and the second light-entering surface that are arranged adjacent to each other, and a first connection surface arranged on the transparent substrate 101, where both the first light-entering surface and the second light-entering surface are connected to the first connection surface; the second prism structure 103 includes the first light-exiting surface and the second light-exiting surface that are arranged adjacent to each other, and a second connection surface arranged on the transparent substrate 101, where both the first light-exiting surface and the second light-exiting surface are connected to the second connection surface;

the first incident light 100 enters the first prism structure 102 from the first light-entering surface, is total-reflected at an inner side of the second light-entering surface, and then exits from the first light-exiting surface;

the second incident light 200 enters the first prism structure 102 from the second light-entering surface, is total-reflected at an inner side of the first light-entering surface, and then exits from the second light-exiting surface.

Figure 1:
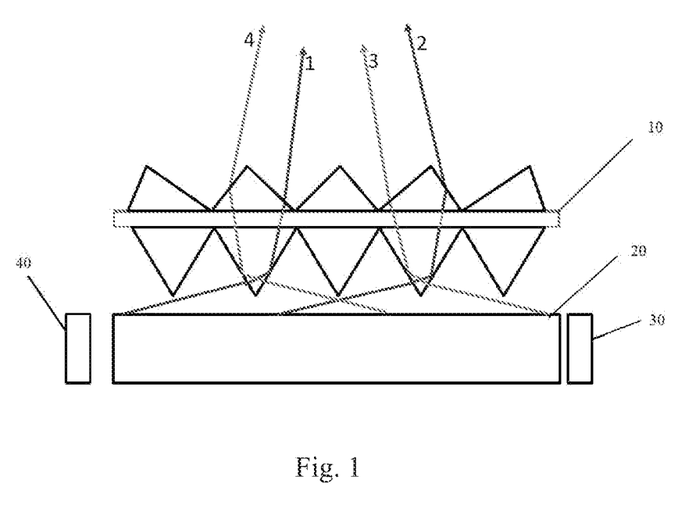
FIG. 1 is a schematic structural diagram of a backlight device according to an embodiment of the present disclosure.

Referring to FIG. 1 to FIG. 6, cross-sections of the first prism structures 102 and the second prism structures 103 in the embodiment of the present disclosure are all triangular. In FIG. 1, light 1 and light 2 (directions of the light 1 and the light 2 are the same) emitted by a light source 40 pass through a light guide plate 20, the first prism structures 102 and the second prism structures 103, and then exit at two positions at two angles respectively (the light 1 and the light 2 enter the first light-entering surfaces of two different first prism structures 102 and exit from the first light-exiting surfaces of two different second prism structures 103; the exiting angles of the light 1 and the light 2 are different). The light emitted by the light source 40 reaches an opposite side of the light guide plate 20 (a side of the light guide plate 20 opposite to a side where the light source 40 is located) and is reflected by a reflective structure 30. A reflected light 3 and a reflected light 4 pass through the light guide plate 20, the first prism structures 102 and the second prism structures 103, and then also exit at two positions at two angles respectively (the reflected light 3 and the reflected light 4 enter the second light-entering surfaces of two different first prism structures 102 and exit from the second light-exiting surfaces of two different second prism structures 103; the exiting angles of the reflected light 3 and the reflected light 4 are different). The first prism structures 102 and the second prism structures 103 have respective center-symmetric distributions; with parameters of the first prism structures 102 and the second prism structures 103 (including the angle between the adjacent first and second light-entering surfaces, etc.) being adjusted, the exiting angles of the light 1 and the reflected light 4 exiting at the same position (exiting from the first light-exiting surface and the second light-exiting surface of the same second prism structure 103) can be the same; the exiting angles of the light 2 and the reflected light 3 exiting at the same position (exiting from the first light-exiting surface and the second light-exiting surface of the same second prism structure 103) can be the same, and the exiting angles can be matched with the VR optical path.

In the embodiment of the present disclosure, the exiting angle of the light exiting from the first light-exiting surface satisfies following formula:

$$\theta_{12} = \arcsin\left\{n_2 * \sin\left[\beta_2 + \alpha_2 - \alpha_3 + \arcsin\frac{\sin(\theta_4 - \alpha_1)}{n_1}\right]\right\} - \beta_2 \quad (1)$$

where, $\theta_{12}$ is an angle between the light exiting from the first light-exiting surface and a direction perpendicular to the second surface, $\theta_4$ is an angle between the first incident light 100 and a direction perpendicular to the first surface, $n_1$ is a refractive index of the first prism structure 102, $n_2$ is a refractive index of the second prism structure 103, $\alpha_1$ is an angle between the first light-entering surface and the first surface, and $\alpha_2$ is an angle between the second light-entering surface and the first surface, $\beta_2$ is an angle between the first light-exiting surface and the second surface, $\alpha_3$ is an angle between the first light-entering surface and the second light-entering surface.

Figure 2:
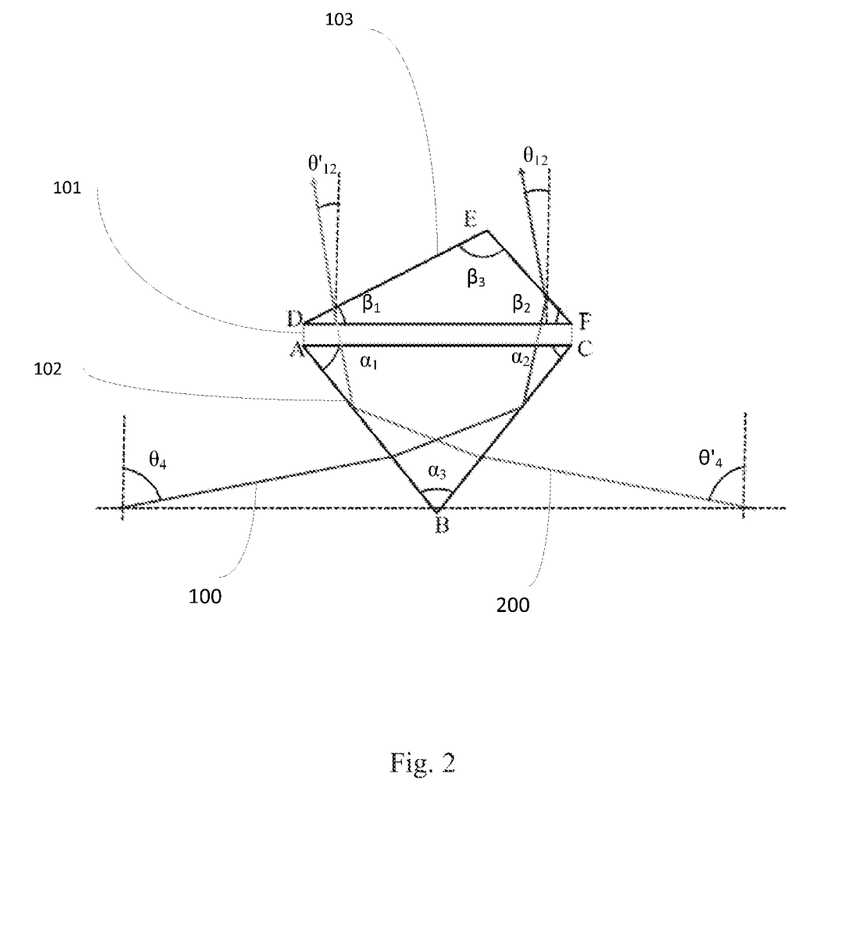
FIG. 2 is a schematic diagram of optical paths of a first incident light and a second incident light according to an embodiment of the present disclosure.
Figure 3:
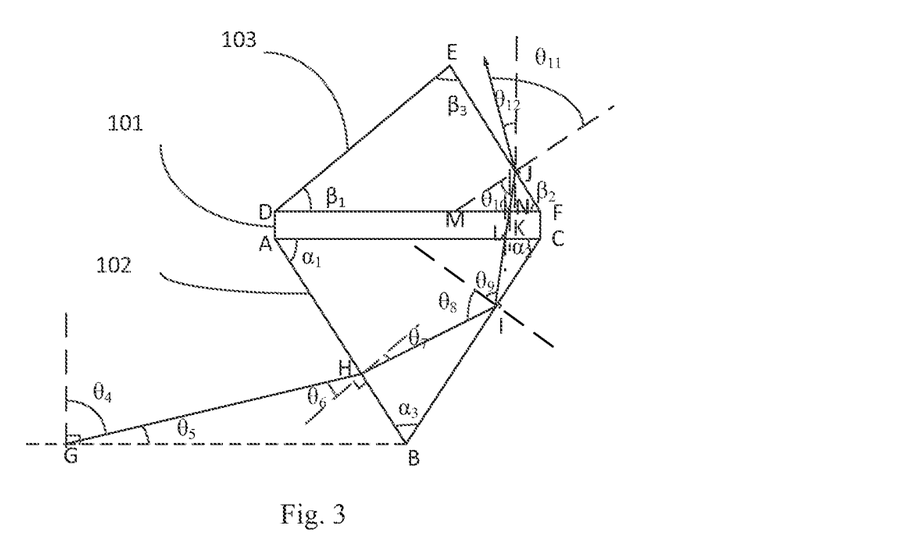
FIG. 3 is a schematic diagram of an optical path of a first incident light according to an embodiment of the present disclosure.
Figure 4:
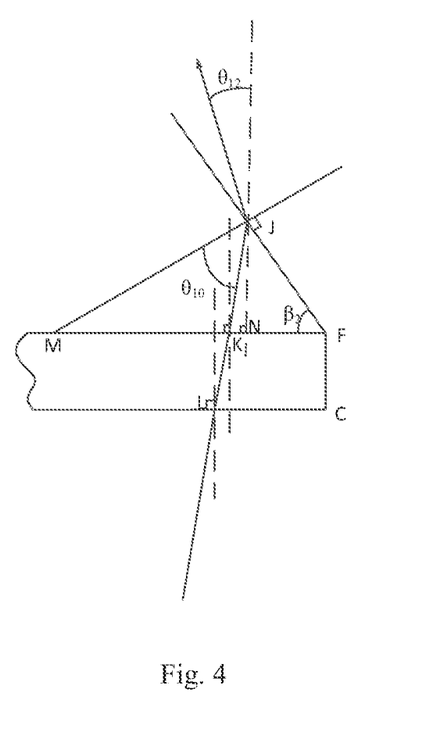
FIG. 4 is an enlarged diagram of a partial structure of FIG. 3.

Referring to FIG. 2, FIG. 3 and FIG. 4, according to the refraction law, the total reflection law and the geometric angle relationship, the following relational formulae can be derived:

$$\theta_4 + \theta_5 = \frac{\pi}{2}; \quad (2)$$

$$\theta_6 + \frac{\pi}{2} = \pi - \theta_5 - \alpha_1; \quad (3)$$

$$\alpha_1 + \alpha_2 + \alpha_3 = \pi; \quad (4)$$

$$\theta_7 + \theta_8 = \alpha_3; \quad (5)$$

$$\frac{\pi}{2} + (\beta_2 - \theta_{10}) = \pi - \left(\frac{\pi}{2} - \theta_9\right) - \alpha_2; \quad (6)$$

$$\sin\theta_6 = n_1 * \sin\theta_7; \quad (7)$$

$$\theta_8 = \theta_9; \quad (8)$$

$$n_2 * \sin\theta_{10} = \sin\theta_{11}; \quad (9)$$

$$\theta_{12} = \theta_{11} - \beta_2. \quad (10)$$

The formula (3) is derived based on a triangle GBH and a triangle ABC:

$$\angle G + \angle B + \angle H = \pi;$$

$$\angle GBH = \alpha_1.$$

The formula (5) is derived from the following formulae:

$$\angle BHI + \theta_7 = \frac{\pi}{2};$$

$$\angle BIH + \theta_8 = \frac{\pi}{2};$$

$$\angle BHI + \angle BIH + \alpha_3 = \pi.$$

The formula (6) is derived from the following formulae:

$$\beta_2 + \angle FKJ + \angle KJF = \pi; \quad (a)$$

$$\theta_{10} + \angle KJF = \frac{\pi}{2}; \quad (b)$$

from the formulae (a) and (b), the following formula can be derived:

$$\frac{\pi}{2} + (\beta_2 - \theta_{10}) = \pi - \angle FKJ = \angle DKJ, \quad (e)$$

$$\theta_9 + \angle LIC = \frac{\pi}{2}; \quad (c)$$

$$\alpha_2 + \angle LIC + \angle ILC = \pi; \quad (d)$$

from the formulae (c) and (d), the following formula can be derived $$\pi - \left(\frac{\pi}{2} - \theta_9\right)\alpha_2 - \angle ILC, \quad (f)$$

in a specific implementation of the embodiment, the refractive index of the first prism structures 102 and the refractive index of the second prism structures 103 are the same, that is, the light entering the substrate is parallel to the light exiting from the transparent substrate 101. Therefore, $\angle DKJ = \angle ILC$, (g). The above formula (6) is derived from the formulae (e), (f), (g).

It should be noted that the refractive index of the first prism structure 102 and the refractive index of the second prism structure 103 may also be different. In this case, the following formula applies: $n_1*\cos(\angle DKJ) = n_2*\cos(\angle ILC)$. By combining it with formulae (e) and (f), the following formula can be derived:

$$n_1 * \cos\left[\frac{\pi}{2} + (\beta_2 - \theta_{10})\right] = n_2 * \cos\left[\pi - \left(\frac{\pi}{2} - \theta_9\right) - \alpha_2\right],$$

which then can be combined with the aforementioned other formulae to acquire the required derivation formula of $\theta_{12}$.

The formula (10) can be derived from following formulae:

$$\beta_2 + \angle FMJ = \frac{\pi}{2};$$

$$\angle FMJ + \angle MJN = \frac{\pi}{2};$$

$$\theta_{11} - \theta_{12} = \angle MJn.$$

A propagation process of the light passing through the first prism structure 102, the transparent substrate 101 and the second prism structure 103 must meet the following conditions: to be total-reflected at a BC side, an incident angle of the light must be greater than a critical total reflection angle; to be refracted at an EF side, an incident angle of the light must be less than a critical total reflection angle. The specific conditions to be met are as follows:

$$\theta_8 > \arcsin\frac{1}{n_1};$$

$$\theta_{10} < \arcsin\frac{1}{n_2}.$$

In the embodiment of the present disclosure, an exiting angle of a light exiting from the second light-exiting surface satisfies following formula:

$$\theta'_{12} = \beta_1 - \arcsin\left\{n_2 * \sin\left[\beta_2 + \alpha_1 - \alpha_3 + \arcsin\frac{\sin(\theta'_4 - \alpha_2)}{n_1}\right]\right\} \quad (11)$$

where, $\theta'_{12}$ is an angle between the light exiting from the second light-exiting surface and a direction perpendicular to the second surface, $\theta'_4$ is an angle between the second incident light 200 and a direction perpendicular to the first surface, n is a refractive index of the transparent substrate 101, $n_1$ is a refractive index of the first prism structure 102, $n_2$ is a refractive index of the second prism structure 103, $\alpha_1$ is an angle between the first light-entering surface and the first surface, $\alpha_2$ is an angle between the second light-entering surface and the first surface, $\alpha_3$ is an angle between the first light-entering surface and the second light-entering surface, $\beta_1$ is an angle between the second light-exiting surface and the second surface, $\beta_2$ is an angle between the first light-exiting surface and the second surface.

Figure 5:
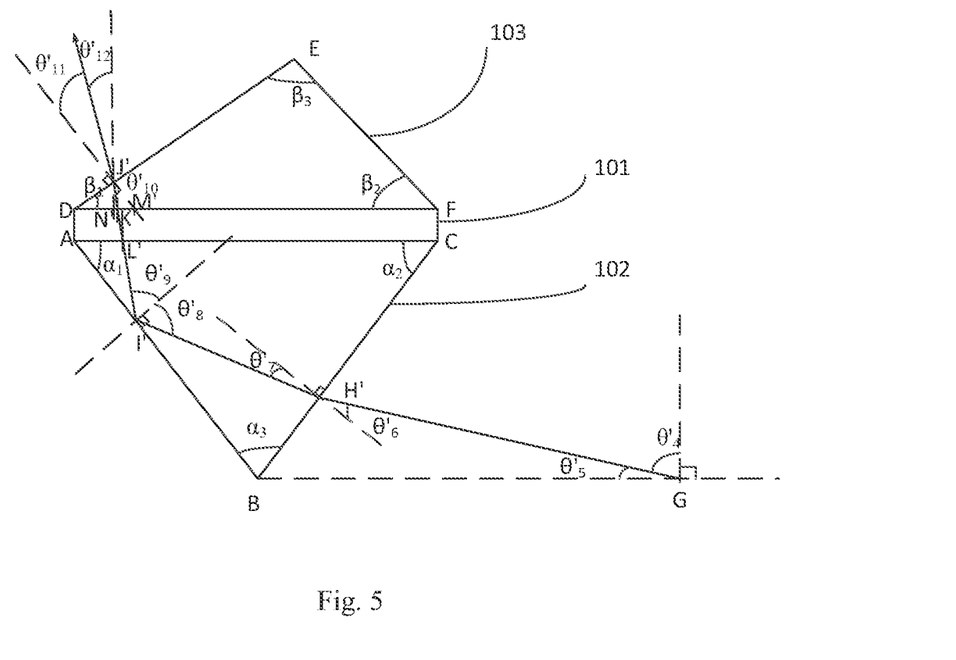
FIG. 5 is a schematic diagram of an optical path of a second incident light according to an embodiment of the present disclosure.
Figure 6:
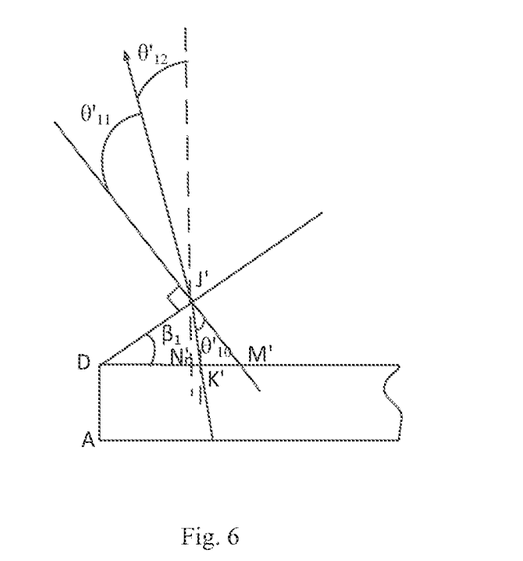
FIG. 6 is an enlarged diagram of a partial structure of FIG. 5.

Referring to FIG. 2, FIG. 5 and FIG. 6, according to the refraction law, the total reflection law and the geometric angle relationship, the following relational formulae can be derived:

$$\theta'_4 + \theta'_5 = \frac{\pi}{2}; \tag{12}$$

$$\theta'_6 + \frac{\pi}{2} = \pi - \theta'_5 - \alpha_2; \tag{13}$$

$$\alpha_1 + \alpha_2 + \alpha_3 = \pi; \tag{14}$$

$$\theta'_7 + \theta'_8 = \alpha_3; \tag{15}$$

$$\frac{\pi}{2} - (\theta'_{10} + \beta_1) = \pi - \left(\frac{\pi}{2} - \theta'_9\right) - \alpha_1; \tag{16}$$

$$\sin\theta'_6 = n_1 * \sin\theta'_7; \tag{17}$$

$$\theta'_8 = \theta'_9; \tag{18}$$

$$n_2 * \sin\theta'_{10} = \sin\theta'_{11}; \tag{19}$$

$$\theta'_{12} = \beta_1 - \theta'_{11}. \tag{20}$$

The formula (13) is derived based on a triangle GBH and a triangle ABC:

$$\angle G + \angle B + \angle H' = \pi;$$

$$\angle GBH' = \alpha_1.$$

The formula (15) is derived from the following formulae:

$$\angle BH'I' + \theta'_7 = \frac{\pi}{2};$$

$$\angle BI'H' + \theta'_8 = \frac{\pi}{2};$$

$$\angle BH'I' + \angle BI'H' + \alpha_3 = \pi.$$

The formula (16) is derived from the following formulae:

$$\beta_1 + \angle DK'J' + \angle K'J'D = \pi; \tag{a'}$$

$$\theta'_{10} + \angle K'J'D = \frac{\pi}{2}; \tag{b'}$$

from the formulae (a') and (b'), the following formula can be derived:

$$\theta'_{10}) = \pi - \angle DK'J' = \angle FK'J', \tag{e'}$$

$$\theta'_9 + \angle L'I'A = \frac{\pi}{2}; \tag{c'}$$

$$\alpha_1 + \angle L'I'A + \angle I'L'A = \pi; \tag{d'}$$

from the formulae (c') and (d'), the following formula can be derived:

$$\pi - \left(\frac{\pi}{2} - \theta'_9\right) - \alpha_1 \angle I'L'A, \tag{f'}$$

in a specific implementation of the present embodiment, the refractive index of the first prism structures 102 and the refractive index of the second prism structures 103 are the same, that is, the light entering the substrate is parallel to the light exiting from the transparent substrate 101. Therefore, $\angle FK'J' = \angle I'L'A$, (g'). The above formula (16) is derived from the formulae (e'), (f'), (g').

It should be noted that the refractive index of the first prism structures 102 and the refractive index of the second prism structures 103 may also be different. In this case, the following formula applies: $n_1 * \cos(\angle FK'J') = n_2 * \cos(\angle I'L'A)$. By combining it with formulae (e) and (f), the following formula can be derived:

$$n_1 * \cos\left[\frac{\pi}{2} + (\beta_{1-}\theta'_{10})\right] = n_2 * \cos\left[\pi - \left(\frac{\pi}{2} - \theta'_9\right) - \alpha_1\right],$$

which then can be combined with the aforementioned other formulae to acquire the required derivation formula of $\theta'_{12}$.

The formula (20) is derived from following formulae:

$$\beta_1 + \angle DM'J' = \frac{\pi}{2};$$

$$\angle DM'J' + \angle M'J'N' = \frac{\pi}{2};$$

$$\theta'_{11} + \theta'_{12} = \angle M'J'N'.$$

A propagation process of the light passing through the first prism structure 102, the transparent substrate 101 and the second prism structure 103 must meet the following conditions: to be total-reflected at an AB side, an incident angle of the light must be greater than a critical total reflection angle; to be refracted at a DE side, an incident angle of the light must be less than a critical total reflection angle. The specific conditions to be met are as follows:

$$\theta'_8 > \arcsin\frac{1}{n_1};$$

$$\theta'_{10} < \arcsin\frac{1}{n_2}.$$

According to the above formula (1) and formula (11), the angles ($\alpha_1, \alpha_2, \alpha_3, \beta_1, \beta_2, \beta_3$) of the first prism structure 102 and the second prism structure 103 can be set as needed, so that the difference value between the first predetermined angle and the second predetermined angle is less than the predetermined value. In a specific implementation of the embodiment, in the case that the first incident light 100 and the second incident light 200 satisfy $\theta_4 = \theta'_4$, an appropriate selection of angles of the first prism structure 102 and the second prism structure 103 ($\alpha_1, \alpha_2, \alpha_3, \beta_1, \beta_2, \beta_3$) can lead to $\theta_{12} = \theta'_{12}$. Thus, a better effect of performing the light directing for incident light in two directions is achieved.

Figure 7:
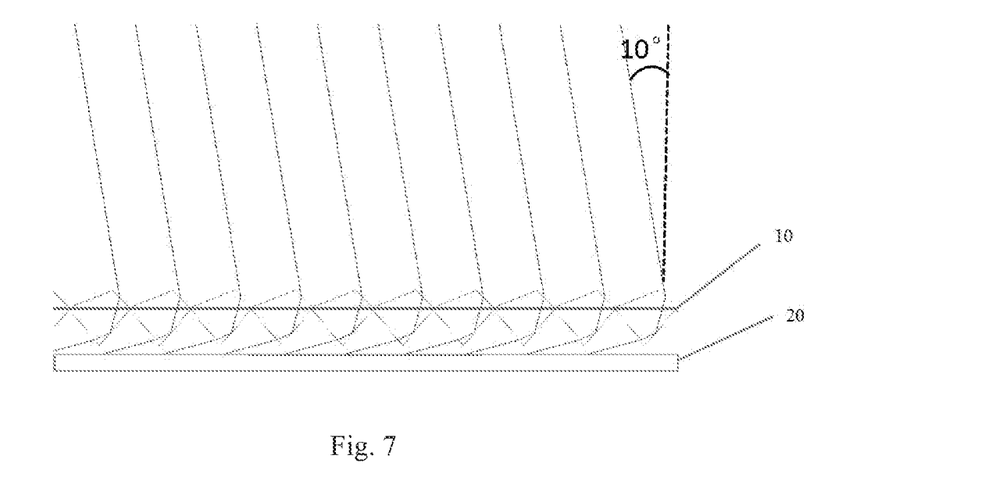
FIG. 7 is a schematic diagram of an optical path of a first incident light passing through and then exiting from the light conversion structure according to an embodiment of the present disclosure.
Figure 8:
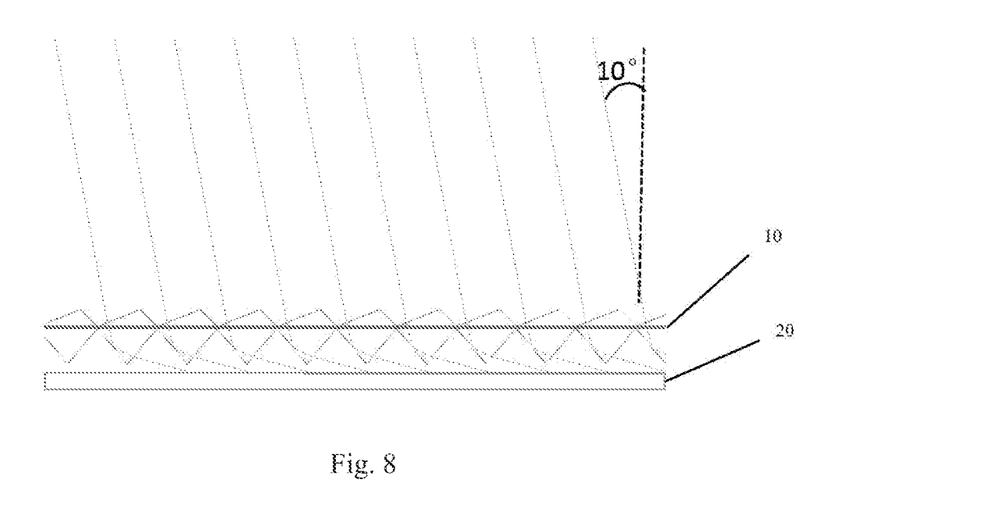
FIG. 8 is a schematic diagram of an optical path of a second incident light passing through and then exiting from the light conversion structure according to an embodiment of the present disclosure.

In a specific implementation of the embodiment, it is assumed that a target angle of the VR optical path $\theta_{12} = 10°$. Taking a simple case for example, let $\alpha_1 = \alpha_2 = 50°$, $\theta_4 = 75°$, n=1.5, $n_1$=1.6, $n_2$=1.6, then according to the formula (1) and the formula (11), a numerical solution can be separately obtained: $\beta_1$=21.6°, $\beta_2$=45.3°. A Lighttools model is established with the corresponding angle parameters (optical modeling). The corresponding light paths simulated by the Lighttools are as shown in FIG. 7 and FIG. 8. It can be seen that, for the light conversion structure 10 of the embodiment, the first incident light 100 and the second incident light 200 have a uniform exiting angle, namely, 10°, after passing through the light conversion structure 10.

In the embodiment of the present disclosure, an area of the first connection surface is the same as an area of the second connection surface, an orthographic projection of the first connection surface of each first prism structure 102 onto the transparent substrate 101 completely overlaps an orthographic projection of the second connection surface of the corresponding second prism structure 103 onto the transparent substrate 101, that is, the orthographic projection of the first connecting surface of each first prism structure 102 on the transparent substrate 101 completely overlaps the orthographic projection of the second connecting surface of the corresponding second prism structure 103 on the transparent substrate 101. For example, assuming that one first prism structure is designated as a first sub-prism structure, and one second prism structure corresponding to the first sub-prism structure is designated as a second sub-prism structure, the orthographic projection of the first connecting surface of the first sub-prism structure onto the transparent substrate 101 completely overlaps the orthographic projection of the second sub-prism structure onto the transparent substrate 101.

With the above technical solution, the first prism structures 102 and the second prism structures 103 are arranged in a one-to-one correspondence, so that the incident light entering one first prism structures 102 can exit from the second prism structure 103 corresponding to the first prism structure 102, which facilitates the adjustment of the light exiting angles.

In a specific implementation of the present embodiment, the refractive index of the first prism structures 102 and the refractive index of the second prism structures 103 are the same, but the present disclosure is not limited to this. The refractive index of the first prism structures 102 and the refractive index of the second prism structures 103 being the same facilitates the selection of materials of the first prism structures 102 and the second prism structures 103, simplifies a calculation process for the first predetermined angle and the second predetermined angle, facilitates the adjustment of the corresponding angles of the first prism structures 102 and the second prism structures 103, and facilitates the acquisition of the desired light-exiting angle.

In the embodiment of the present disclosure, the first prism structures 102, the transparent substrate 101 and the second prism structures 103 are integrally formed. Thus, process steps are simplified, and a stability of the first prism structures 102, the transparent substrate 101 and the second prism structures 103 is enhanced.

A backlight device is further provided by an embodiment of the present disclosure. The backlight device includes the light guide plate 20 and the aforementioned light conversion structure 10, where the light guide plate 20 includes a light-exiting surface, and the light conversion structure 10 is located on a light-exiting side of the light guide plate 20, the light guide plate 20 further includes the light source 40 located on a first side of the light guide plate 20 adjacent to the light-exiting surface of the light guide plate 20, and the reflective structure 30 located on a second side of the light guide plate 20 opposite to the first side;
   the first incident light 100 is light emitted by the light source 40 that propagates through the light guide plate 20 and directly exits from the light-exiting surface of the light guide plate 20;
   the second incident light 200 is light emitted by the light source 40 that propagates through the light guide plate 20, exits from the second side, is reflected back into the light guide plate 20 by the reflective structure 30 and then is guided out by the light guide plate 20.

In this embodiment, the light-entering surface of the light guide plate 20 is arranged adjacent to the light-exiting surface of the light guide plate 20, the light source 40 is arranged directly facing the light-entering surface, and the backlight device is a side-lit backlight device.

The backlight device in the embodiment can be applied to the VR display backlight device with a relatively small screen size and having substantial reflected light. The light conversion structure can use the reflected light to achieve the light directing, so as to improve the light energy utilization ratio, and reduce the power consumption of a VR display device.

A virtual reality display device is further provided by an embodiment of the present disclosure. The virtual reality display device includes the aforementioned backlight device.

With the arrangement of the light conversion structure 10, the first incident light 100 and the second incident light 200 entering the light conversion structure 10 in different directions can exit at predetermined angles, so that with the adjustment of the exiting angles of the incident light, the exiting angles of the incident light can be matched with a VR optical path, and further the exiting angles of the first incident light 100 and the second incident light 200 entering the light conversion structure 10 in different directions can both be matched with the VR optical path, thereby improving the light energy utilization ratio.

The above are the optional embodiments of the present disclosure. It should be noted that for those of ordinary skill in the art, without departing from the principles described in the present disclosure, several improvements and modifications can be made, and these improvements and modifications should also be regarded as falling within the scope of the present disclosure.

What is claimed is:

1. A light conversion structure, comprising:
   a transparent substrate, wherein the transparent substrate comprises a first surface and a second surface arranged oppositely;
   a plurality of first prism structures, wherein the first prism structures are arranged in an array on the first surface forming rows along a first direction and columns along a second direction, each of the first prism structures includes a first light-entering surface and a second light-entering surface that are arranged adjacent or opposite to each other, the first light-entering surface is used to receive a first incident light entering in the first direction, and the second light-entering surface is used to receive a second incident light entering in the second direction;
   a plurality of second prism structures, wherein the second prism structures are arranged in an array on the second surface in accordance with the rows and columns, the plurality of second prism structures are arranged in a one-to-one correspondence with the plurality of first prism structures, each of the second prism structures includes a first light-exiting surface and a second light-exiting surface that are arranged adjacent or opposite to each other;

wherein the first incident light enters the first prism structure from the first light-entering surface, passes through the transparent substrate and the second prism structure corresponding to the first prism structure, and exits from the first light-exiting surface at a first predetermined angle;

the second incident light enters the first prism structure from the second light-entering surface, passes through the transparent substrate and the second prism structure corresponding to the first prism structure, and exits from the second light-exiting surface at a second predetermined angle;

a difference value between the first predetermined angle and the second predetermined angle is less than a predetermined value;

wherein the first prism structures in each row or each column are symmetrically arranged with respect to a center of the row or a center of the column;

the second prism structures in each row or each column are symmetrically arranged with respect to a center of the row or a center of the column;

wherein the first incident light and second incident light in different directions, after being deflected by the light conversion structure, both exit in directions converging toward a center of the transparent substrate.

2. The light conversion structure according to claim 1, wherein the first predetermined angle is an angle between a light exiting from the first light-exiting surface and a direction perpendicular to the second surface, the second predetermined angle is an angle between a light exiting from the second light-exiting surface and the direction perpendicular to the second surface, the first predetermined angle is the same as the second predetermined angle.

3. The light conversion structure according to claim 1, wherein the first prism structure comprises the first light-entering surface and the second light-entering surface that are arranged adjacent to each other, and a first connection surface arranged on the transparent substrate, both the first light-entering surface and the second light-entering surface are connected to the first connection surface; the second prism structure comprises the first light-exiting surface and the second light-exiting surface that are arranged adjacent to each other, and a second connection surface arranged on the transparent substrate, both the first light-exiting surface and the second light-exiting surface are connected to the second connection surface;

the first incident light enters the first prism structure from the first light-entering surface, is total-reflected at an inner side of the second light-entering surface, and then exits from the first light-exiting surface;

the second incident light enters the first prism structure from the second light-entering surface, is total-reflected at an inner side of the first light-entering surface, and then exits from the second light-exiting surface.

4. The light conversion structure according to claim 3, wherein a refractive index of the first prism structure and a refractive index of the second prism structure are the same.

5. The light conversion structure according to claim 4, wherein an exiting angle of a light exiting from the first light-exiting surface satisfies following formula:

$$\theta_{12} = \arcsin\left\{n_2 * \sin\left[\beta_2 + \alpha_2 - \alpha_3 + \arcsin\frac{\sin(\theta_4 - \alpha_1)}{n_1}\right]\right\} - \beta_2$$

wherein $\theta_{12}$ is an angle between the light exiting from the first light-exiting surface and a direction perpendicular to the second surface, $\theta_4$ is an angle between the first incident light and a direction perpendicular to the first surface, $n_1$ is a refractive index of the first prism structure, $n_2$ is a refractive index of the second prism structure, $\alpha_1$ is an angle between the first light-entering surface and the first surface, and $\alpha_2$ is an angle between the second light-entering surface and the first surface, $\beta_2$ is an angle between the first light-exiting surface and the second surface, $\alpha_3$ is an angle between the first light-entering surface and the second light-entering surface.

6. The light conversion structure according to claim 4, wherein an exiting angle of a light exiting from the second light-exiting surface satisfies following formula:

$$\theta'_{12} = \beta_1 - \arcsin\left\{n_2 * \sin\left[\beta_2 + \alpha_1 - \alpha_3 + \arcsin\frac{\sin(\theta'_4 - \alpha_2)}{n_1}\right]\right\}$$

wherein $\theta'_{12}$ is an angle between the light exiting from the second light-exiting surface and a direction perpendicular to the second surface, $\theta'_4$ is an angle between the second incident light and a direction perpendicular to the first surface, $n_1$ is a refractive index of the first prism structure, $n_2$ is a refractive index of the second prism structure, $\alpha_1$ is an angle between the first light-entering surface and the first surface, and $\alpha_2$ is an angle between the second light-entering surface and the first surface, $\alpha_3$ is an angle between the first light-entering surface and the second light-entering surface, $\beta_1$ is an angle between the second light-exiting surface and the second surface, $\beta_2$ is an angle between the first light-exiting surface and the second surface.

7. The light conversion structure according to claim 3, wherein an area of the first connection surface is the same as an area of the second connection surface, an orthographic projection of the first connection surface of each first prism structure onto the transparent substrate completely overlaps an orthographic projection of the second connection surface of the corresponding second prism structure onto the transparent substrate.

8. The light conversion structure according to claim 1, wherein the first prism structures, the transparent substrate and the second prism structures are integrally formed.

9. A backlight device, comprising a light guide plate and a light conversion structure, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

wherein the light conversion structure further comprises:
a transparent substrate, wherein the transparent substrate comprises a first surface and a second surface arranged oppositely;
a plurality of first prism structures, wherein the first prism structures are arranged in an array on the first surface forming rows along a first direction and columns along a second direction, each of the first prism structures includes a first light-entering surface and a second light-entering surface that are arranged adjacent or opposite to each other, the first light-entering surface is used to receive a first incident light entering in the first direction, and the second light-entering surface is used to receive a second incident light entering in the second direction;

a plurality of second prism structures, wherein the second prism structures are arranged in an array on the second surface in accordance with the rows and columns, the plurality of second prism structures are arranged in a one-to-one correspondence with the plurality of first prism structures, each of the second prism structures includes a first light-exiting surface and a second light-exiting surface that are arranged adjacent or opposite to each other;

wherein the first incident light enters the first prism structure from the first light-entering surface, passes through the transparent substrate and the second prism structure corresponding to the first prism structure, and exits from the first light-exiting surface at a first predetermined angle;

the second incident light enters the first prism structure from the second light-entering surface, passes through the transparent substrate and the second prism structure corresponding to the first prism structure, and exits from the second light-exiting surface at a second predetermined angle;

a difference value between the first predetermined angle and the second predetermined angle is less than a predetermined value;

wherein the first prism structures in each row or each column are symmetrically arranged with respect to a center of the row or a center of the column;

the second prism structures in each row or each column are symmetrically arranged with respect to a center of the row or a center of the column;

wherein the first incident light and second incident light in different directions, after being deflected by the light conversion structure, both exit in directions converging toward a center of the transparent substrate;

wherein the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

10. A virtual reality display device, comprising the backlight device according to claim 9.

11. A backlight device, comprising a light guide plate and the light conversion structure according to claim 2, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

12. A backlight device, comprising a light guide plate and the light conversion structure according to claim 3, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

13. A backlight device, comprising a light guide plate and the light conversion structure according to claim 4, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

14. A backlight device, comprising a light guide plate and the light conversion structure according to claim 5, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

15. A backlight device, comprising a light guide plate and the light conversion structure according to claim 6, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

16. A backlight device, comprising a light guide plate and the light conversion structure according to claim 7, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

17. A backlight device, comprising a light guide plate and the light conversion structure according to claim 8, wherein the light guide plate comprises a light-exiting surface, and the light conversion structure is located on a light-exiting side of the light guide plate, the light guide plate further comprises a light source located on a first side of the light guide plate adjacent to the light-exiting surface of the light guide plate, and a reflective structure located on a second side of the light guide plate opposite to the first side;

the first incident light is light emitted by the light source that propagates through the light guide plate and directly exits from the light-exiting surface of the light guide plate;

the second incident light is light emitted by the light source that propagates through the light guide plate, exits from the second side, is reflected back into the light guide plate by the reflective structure and then is guided out by the light guide plate.

* * * * *